United States Patent
Yoon et al.

(10) Patent No.: US 7,042,812 B2
(45) Date of Patent: *May 9, 2006

(54) METHOD AND APPARATUS FOR CANCELING GLITCH NOISE FROM TRACK CROSS SIGNAL

(75) Inventors: Hyeong-deok Yoon, Gyeonggi-do (KR); Young-jun Ahn, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 87 days.

This patent is subject to a terminal disclaimer.

(21) Appl. No.: 10/348,006

(22) Filed: Jan. 22, 2003

(65) Prior Publication Data

US 2004/0141428 A1    Jul. 22, 2004

(30) Foreign Application Priority Data

Jan. 22, 2002    (KR) ................................. 2002-3712

(51) Int. Cl.
G11B 21/08    (2006.01)
(52) U.S. Cl. .................................................. 369/30.17
(58) Field of Classification Search ............. 369/30.13, 369/30.1, 30.11, 30.12, 30.14, 30.15, 30.16, 369/30.17, 44.28, 44.27, 44.29
See application file for complete search history.

(56) References Cited

U.S. PATENT DOCUMENTS

| 5,351,222 | A  | * | 9/1994  | Ikeda et al. ............... | 369/30.17 |
| 5,699,332 | A  | * | 12/1997 | Nakano .................... | 369/30.16 |
| 6,218,870 | B1 | * | 4/2001  | Wilson ........................ | 327/34 |
| 6,621,773 | B1 | * | 9/2003  | Lin ........................... | 369/30.14 |
| 6,757,226 | B1 | * | 6/2004  | Chan ........................ | 369/30.13 |

FOREIGN PATENT DOCUMENTS

| JP | 01-232582     |   | 9/1989  |   |           |
| JP | 02-098878     |   | 4/1990  |   |           |
| JP | 04-212722     |   | 8/1992  |   |           |
| JP | 05-166201     |   | 7/1993  |   |           |
| JP | 2000-285477   |   | 10/2000 |   |           |
| KR | 2002-026676 A | * | 4/2002  |   | 369/30.13 |
| KR | 2002-0319633 A | * | 5/2002  |   | 369/30.13 |

\* cited by examiner

*Primary Examiner*—Tan Dinh
(74) *Attorney, Agent, or Firm*—Stein, McEwen & Bui, LLP

(57) ABSTRACT

A method and apparatus for canceling noise from track cross signal includes binarizing the track cross signal with reference to at least two reference values, and removing noise from the binarized track cross signal based on a command speed according to which a tracking actuator moves a pickup. Accordingly, it is possible to remove noise from a track cross signal so as to obtain information regarding precise speed of track searching or position on the track, irrespective of the searching speed.

25 Claims, 9 Drawing Sheets

FIG. 1 (PRIOR ART)
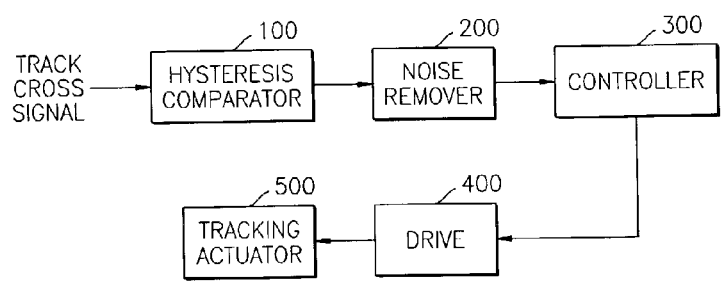
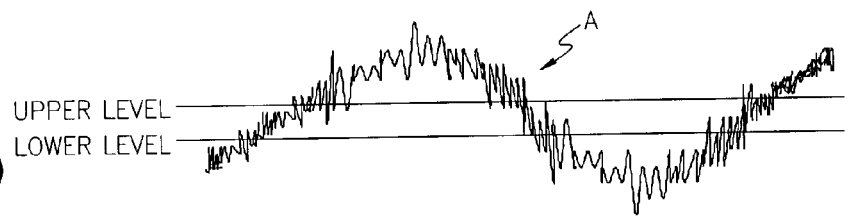
FIG. 2A
(PRIOR ART)
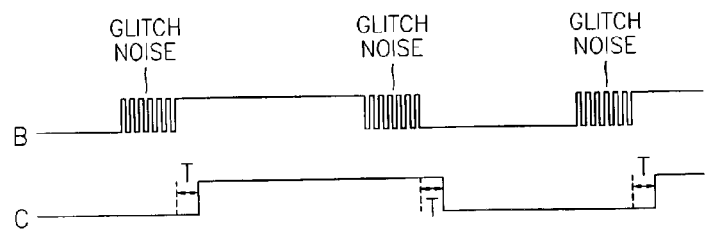
FIG. 2B
(PRIOR ART)
FIG. 2C
(PRIOR ART)

METHOD AND APPARATUS FOR CANCELING GLITCH NOISE FROM TRACK CROSS SIGNAL

CROSS REFERENCE TO RELATED APPLICATION

This application claims the benefit of Korean Patent Application No. 2002-3712, which was filed on Jan. 22, 2002 in the Korean Intellectual Property Office, the disclosure of which is incorporated herein in its entirety by reference.

BACKGROUND OF THE INVENTION

1. Field of the Invention

The present invention relates to track searching on an optical disc drive (ODD), and more particularly, to a method and apparatus of canceling noise from a track cross signal generated when an optical spot (generated by a pickup) moves on an optical disc in the radial direction (i.e., it traverses tracks) so as to search for a desired track, a method of controlling an optical disc drive, an optical disc drive, and an optical disc reproducing apparatus.

2. Description of the Related Art

In general, a pickup of an optical disc drive (ODD) performs track searching on an optical disc in one of the following ways: (i) a direct seek control method and (ii) a course seek control method. In the direct seek control method, an optical spot reaches a desired track on an optical disc while searching all tracks through which the optical spot passes while moving in the radial direction. In the coarse seek control method, an optical spot moves directly to a predetermined point on an optical disc (i.e., near a desired track) without searching any track, and then reaches the desired track by searching adjacent tracks. With the coarse search control method, it is easy to search for a desired track, but the total access time is long. On the other hand, although the direct search control method is complicated, the total access time is short. For this reason, recently, the use of the direct seek control method has spread even for long-distance searches for tracks on a compact disc (CD), a digital versatile disc (DVD) drive, and so on.

FIG. 1 is a block diagram of a portion of a conventional optical disc drive. Referring to FIG. 1, the optical disc drive includes a hysteresis comparator 100, a noise removing apparatus 200 to cancel noise from a track cross signal, a controller 300, a drive 400, and a tracking actuator 500. As shown, the track cross signal is a signal read when a pickup (not shown) moves from a predetermined point on an optical disc in the radial direction, and then the optical spot transverses tracks on the optical disc. The track cross signal can be used in detecting the speed and position of the optical spot (pickup). The track cross signal is binarized by the hysteresis comparator 100 and a glitch noise is removed from the signal by the noise removing apparatus 200. Then, the controller 300 generates a control signal in response to the binarized track cross signal from which the noise was removed, and outputs the control signal to the drive 400. Next, the drive 400 drives the tracking actuator 500 in response to the control signal so as to move the pickup (not shown) to a desired point on the optical disc.

FIGS. 2A through 2C are timing diagrams for explaining a conventional method of canceling noise from a track cross signal. Referring to FIG. 2A, a track cross signal A contains noise and is detected by an optical disc. The hysteresis comparator 100 has upper and lower levels as reference levels used to binarize the track cross signal A, thereby obtaining a track zero cross signal B shown in FIG. 2B. However, the glitch noise is still contained in the track zero cross signal B. After one level of the track zero cross signal B changes into the other level, and then the changed level lasts for a predetermined time T, the noise removing apparatus 200 outputs a signal C shown in FIG. 2C. The signal C contains no glitch noise due to changes from the one level into the other level. The more the predetermined time value T is increased, the more clearly the glitch noise contained in a signal is removed. From FIGS. 2A through 2C, it is noted that the rising and falling edges of the signal C in which glitch noise was completely removed, are clearer than those of the signal B.

The time value T is a fixed value when changing the signal B to the signal C (i.e., removing glitch noise from the signal B) using the conventional noise removing apparatus 200. Therefore, in the event that a period of a track cross signal is shorter than two times of the predetermined time value T (i.e., 2 T), the level of the track cross signal changes before 2 T has passed. This makes it difficult to properly detect the signal C.

FIG. 3 is a waveform diagram of a track cross signal obtained by short-distance track searching at low speed. FIG. 4 is a waveform diagram of a track cross signal obtained by long-distance track searching at high speed. As shown in FIGS. 3 and 4, the frequency of the track cross signal obtained by the low-speed track searching is low, ranging from several KHz to tens of KHz. In contrast, the frequency of the track cross signal obtained by the high-speed track searching is very high, ranging from several KHz to hundreds of KHz. Accordingly, in order to obtain the signal C, the time value T must be set in consideration of the frequency of the track cross signal obtained by high-speeding track search.

Specifically, if the time value T is set to be high, it is possible to perfectly remove noise from a track cross signal obtained by the low-speed track searching. However, the frequency of the track cross signal, which is obtained by the high-speed track searching, becomes short and thus noise is not completely removed from the signal B. Specifically, the signal C is not properly detected. For this reason, the time value T is relatively short according to the frequency of the track cross signal during track searching at the high speed. However, in this case, the glitch noise cannot be completely removed from the signal B when searching a track at the low speed.

SUMMARY OF THE INVENTION

To solve the above and other problems, it is an object of the present invention to provide a method and apparatus for completely removing noise from a track cross signal irrespective of the speed of track searching of an optical disc, a method of controlling an optical disc drive using the above method, an optical disc drive, and an optical reproducing apparatus.

It is another object of the present invention to provide a method of removing noise from a track cross signal while adaptively changing a time value T according to the speed of the track searching of an optical disc, a method of controlling an optical disc drive based on the above method, a noise removing apparatus, an optical disc drive, and an optical disc reproducing apparatus.

Additional objects and advantages of the invention will be set forth in part in the description which follows and, in part, will be obvious from the description, or may be learned by practice of the invention.

To achieve the above and for other objects, there is provided a method of removing noise from a track cross signal according to an embodiment of the invention, the method including binarizing the track cross signal with reference to at least two reference values, and removing noise from the binarized track cross signal based on a command speed for a tracking actuator.

According to an aspect of the invention, the binarizing the track cross signal comprises changing the level of the track cross signal to a first level when the amplitude of the track cross signal is larger than a first reference value, changing the level to a second level when the amplitude of the track cross signal is smaller than a second reference value, and maintaining the level of the track cross signal when the amplitude of the track cross signal is at or been the first and second reference values.

According to another aspect of the invention, the removing the noise comprises changing a predetermined level of the track cross signal if the level is maintained from the edges of the binarized track cross signal for at least a predetermined time value, the predetermined time value being inversely proportional to the command speed, and maintaining the predetermined level if the level is not maintained for the predetermined time value.

According to another embodiment of the invention, a method of controlling an optical disc drive includes reading a track cross signal from an optical disc, binarizing the read track cross signal with reference to at least two reference values, removing noise from the binarized track cross signal based on a command speed for a tracking actuator, measuring the speed of a pickup from the track cross signal whose noise is removed and that is binarized, obtaining an offset between the measured speed and the command speed, and providing the offset to the tracking actuator.

According to an aspect of the invention, the binarizing the read track cross signal comprises changing the level of the track cross signal into a first level when the amplitude of the track cross signal is larger than a first reference value, changing the level into a second level when the amplitude is smaller than a second reference value, and maintaining the level when the amplitude is at or between the first and second reference values.

According to another aspect of the invention, the removing the noise comprises changing a predetermined level of the track cross signal if the level is maintained from the edges of the binarized track cross signal for at least a predetermined time value, the predetermined time value being inversely proportional to the command speed, and maintaining the predetermined level if the level is not maintained for the predetermined time value.

According to a further embodiment of the invention, a noise removing apparatus includes a comparator to binarize a track cross signal read from an optical disc with reference to at least two reference values, a controller to generate a command speed to actuate a tracking actuator, a pickup and a noise remover to remove noise from the binarized track cross signal based on the command speed.

According to an additional embodiment of the invention, there is provided an optical disc drive having the noise removing apparatus.

According to still another embodiment of the invention, an optical disc reproducing apparatus includes an optical disc drive comprising a tracking actuator to move a pickup that irradiates light on an optical disc, a comparator to binarize a track cross signal output from the optical disc with reference to at least two reference values, a noise remover to remove noise from the binarized track cross signal based on a command speed to actuate the tracking actuator to move the pickup, and a controller to provide the command speed to the noise remover, to measure the speed of the pickup from the binarized track cross signal from which the noise was removed by the noise remover in order to obtain an offset between the measured speed and the command speed, and to provide the offset to the tracking actuator.

According to still another embodiment of the invention, there is provided an optical disc reproducing apparatus having the optical disc drive.

BRIEF DESCRIPTION OF THE DRAWINGS

The above and other objects and advantages of the present invention will become more apparent and more readily appreciated by describing in detail embodiments thereof with reference to the accompanying drawings in which:

FIG. 1 is a block diagram of a portion of a conventional optical disc drive;

FIGS. 2A through 2C are timing diagrams explaining a conventional method of canceling noise from a track cross signal;

DETAILED DESCRIPTION OF THE EMBODIMENTS

Figure 3:
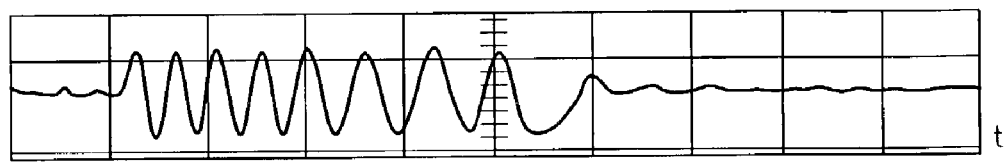
FIG. 3 is a waveform diagram of a track cross signal obtained during low-speed, short-distance track search.
Figure 4:
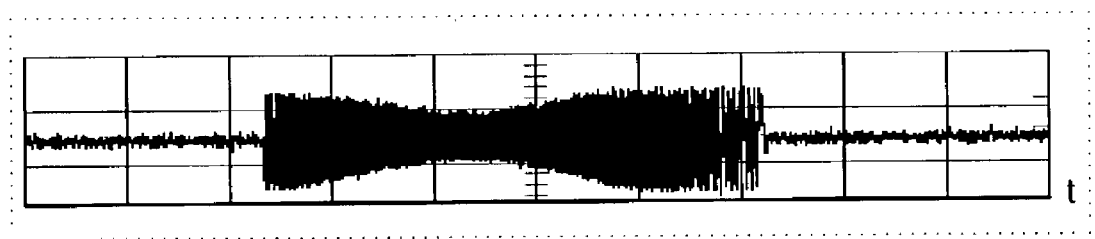
FIG. 4 is a waveform diagram of a track cross signal obtained during high-speed, long-distance track search.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 5:
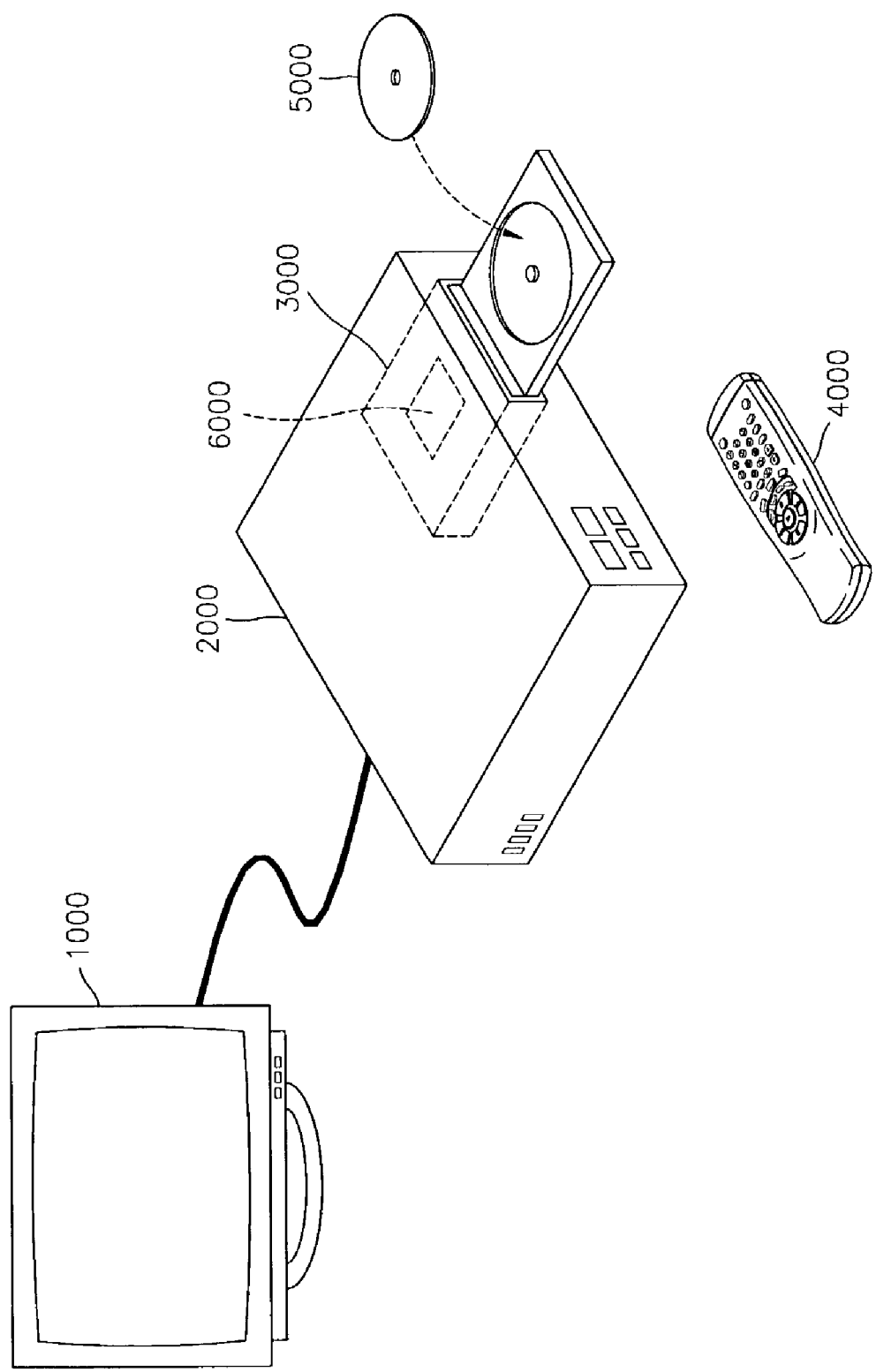
FIG. 5 is a schematic view of a reproduction system according to an embodiment of the present invention.

FIG. 5 is a schematic view of an optical disc reproducing system according to an embodiment of the present invention. Referring to FIG. 5, the optical disc reproducing apparatus system includes a display device 1000 and an optical disc reproducing apparatus 2000. In the optical disc reproducing apparatus 2000, is installed an optical disc drive 3000 including a disc deck on which an optical disc 5000 is placed. The optical disc 5000 is an information storage medium. While shown as being used with a display device 1000, it is understood that the reproducing apparatus 2000 could also be used with other output devices than the display device 1000, such as audio or data output devices.

The optical disc drive 3000 includes a pickup (not shown) to detect a track cross signal generated by the optical disc 5000. The optical disc drive 3000 also includes a noise removing apparatus 6000 to remove noise from the detected track cross signal. A user operates the optical disc reproducing apparatus 2000 and the display device 1000 using a remote controller 4000 having various controlling buttons. If the user plays back the contents recorded on a desired track of the optical disc 5000, the optical disc drive 3000 makes the pickup move to the desired track, reads and decodes the contents, and transmits the decoded contents to the display device 1000. In this embodiment, the display device 1000 is realized as a television or a monitor that displays on a screen a signal transmitted from the optical disc reproducing apparatus 2000. However, it is understood that other input devices can be used, such as keyboards or control panels.

Figure 6:
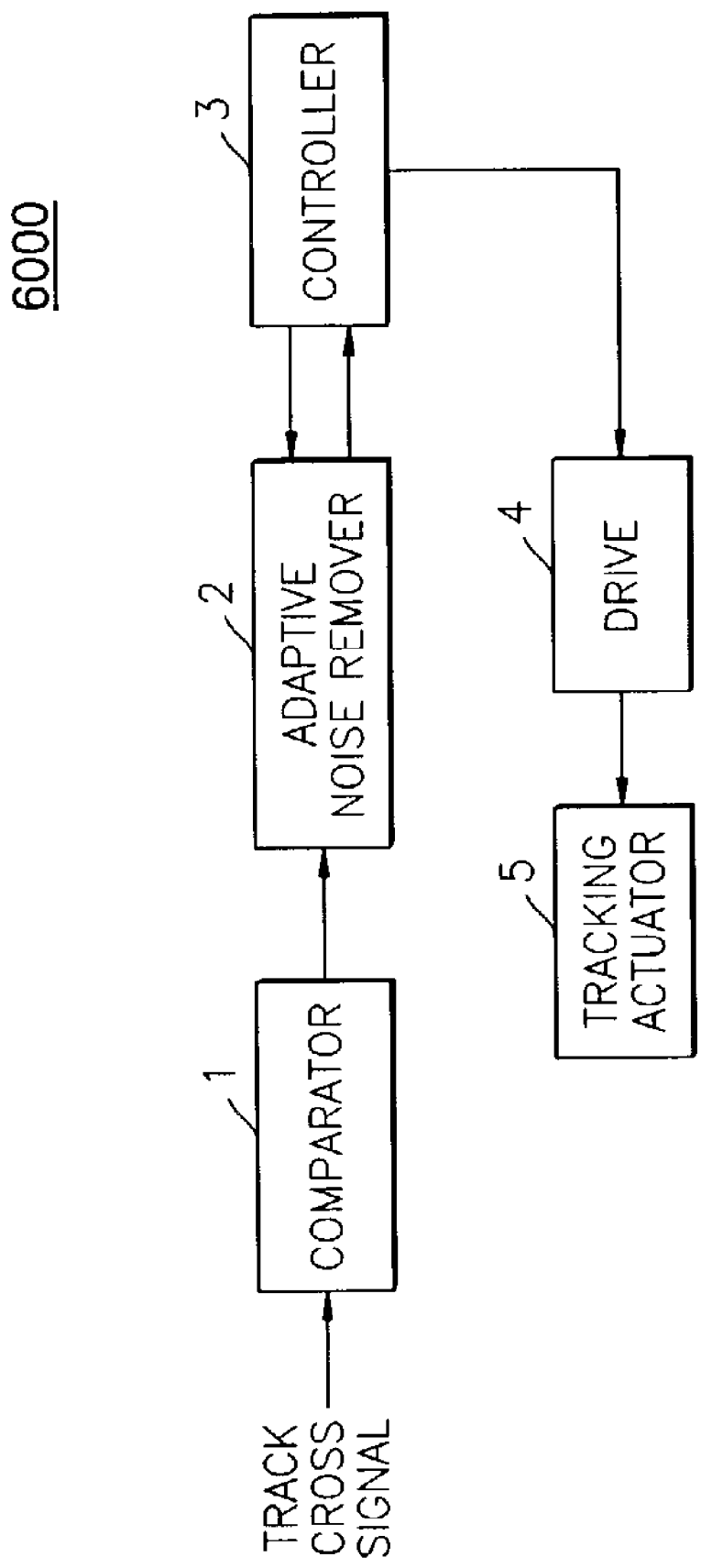
FIG. 6 is a block diagram of a noise removing apparatus according to another embodiment of the present invention.

FIG. 6 is a block diagram of the noise removing apparatus 6000 of FIG. 5 according to an embodiment of the present invention. Referring to FIG. 6, the noise removing apparatus 6000 includes an adaptive comparator 1, an adaptive noise remover 2, a controller 3, a drive 4, and a tracking actuator 5.

As shown, a track cross signal is a signal that has a frequency band from several KHz to 1 MHz, and is detected when the optical spot generated and received by the pickup transverses an optical disc 5000 in the radial direction. The comparator 1 binarizes the track cross signal with reference to at least two reference values. The controller 3 produces a command speed for the tracking actuator 5, and provides the command speed to the adaptive noise remover 2. Then, the adaptive noise remover 2 removes the noise from the track cross signal binarized by the comparator 1 (i.e., a track zero cross signal) using a noise removing width (time value T). The noise removing width T is determined adaptively according to the command speed provided by the controller 3.

In general, the command speed varies according to the distance, speed, and position of a certain track to be searched for. Thus, a control signal also varies according to the command speed. The drive 4 actuates the tracking actuator 5 according to the command speed provided by the controller 3. According to the command speed, the tracking actuator 5 moves the pickup to move the optical spot on a desired track.

The noise removing apparatus 6000 of FIG. 6 can be used in a recording apparatus or a computer system that records information such as audio, video and/or data on an optical disc, and mounted on the optical disc drive 3000.

Figure 7:
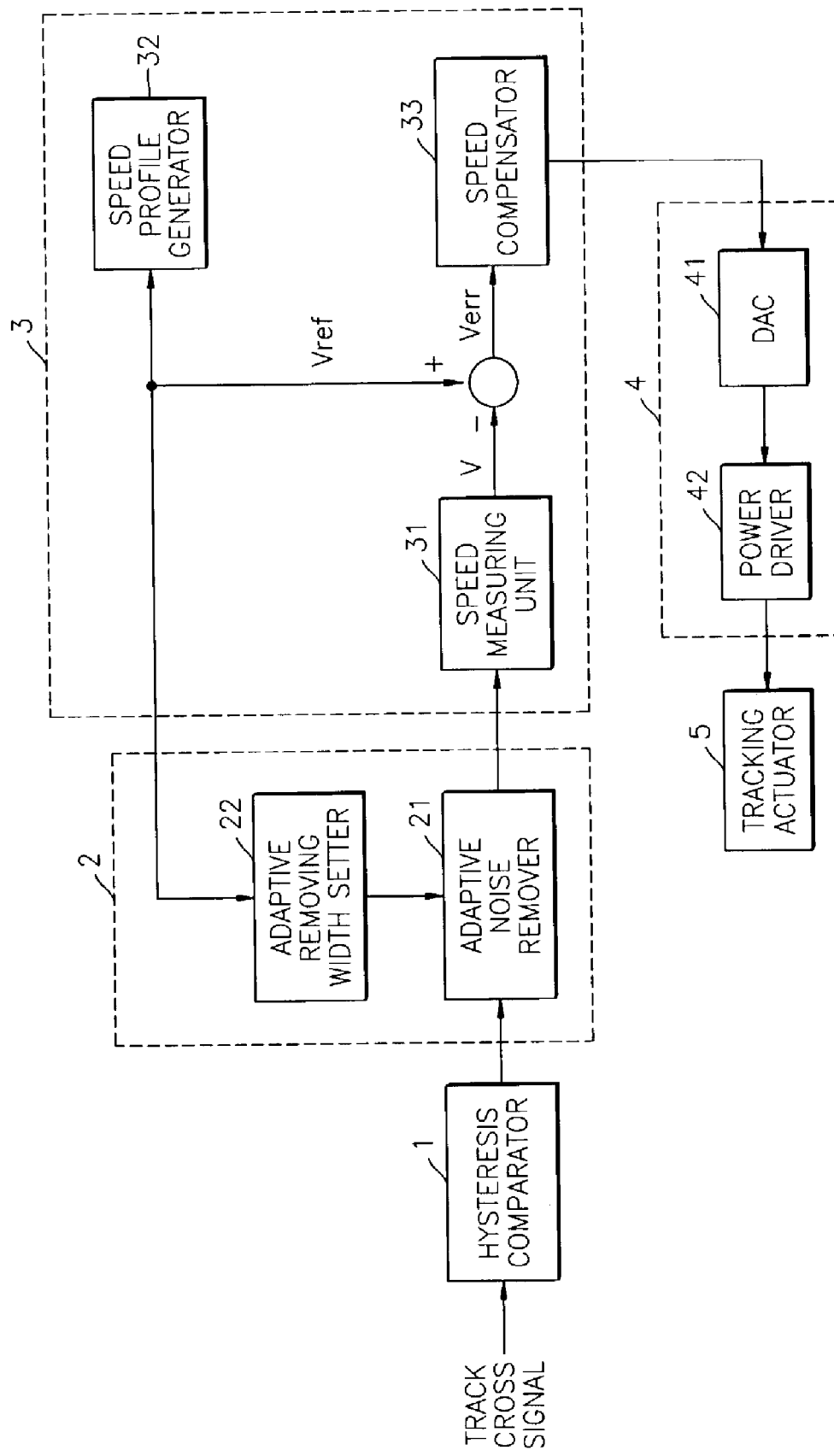
FIG. 7 is a block diagram of the noise removing apparatus of FIG. 6.

FIG. 7 is a view of another embodiment of the noise removing apparatus 6000 of FIGS. 5 and 6. Here, the components that are the same as those in the first embodiment of the noise removing apparatus, are indicated by the same reference numerals, and explanations thereof will be omitted. Referring to FIG. 7, the noise removing apparatus 6000 includes a hysteresis comparator 1, an adaptive noise remover 2, a controller 3, a drive 4, and a tracking actuator 5. The adaptive noise remover 2 includes a noise removing width setter 22 and an adaptive noise remover 21. The controller 3 includes a speed measuring unit 31, a speed profile generator 32, and a speed compensator 33. The drive 4 includes a DA converter 41 and a power drive 42.

The hysteresis comparator 1 binarizes a track cross signal referring to at least two reference values. For instance, when the amplitude of the track cross signal is larger than a first reference value, the track cross signal is binarized to be adapted to a first level. When the amplitude of the track cross signal is smaller than a second reference value, the track cross signal is binarized to be adapted to a second level. When the amplitude of the track cross signal is at or between the first and second reference values, the track cross signal is binarized while keeping the previous level. The reason at least two reference values are used in binarizing the track cross signal is that a great deal of noise is contained in the track cross signal, and thus the amplitude of the track cross signal changes in part excessively. As such, the reference values are adjusted according to the amount of the noise and, ideally, constitute a single value.

The noise removing width setter 22 sets a noise removing width (time value) T based on a command speed Vref provided by the controller 3, and applies the set noise removing width to a register (not shown) included in the noise remover 21. The time value T is calculated by the equation 1, as follows:

$$T = a/Vref \text{ (a is a proportional constant)} \quad (1)$$

In equation 1, the time value T is inversely proportional to the command speed Vref. Specifically, the time value T becomes smaller when the command speed Vref is larger, and the time value T becomes larger when the command speed Vref is smaller. If the command speed Vref changes, the time value T must be reset accordingly. The noise remover 21 outputs a track zero cross signal in which noise is removed, using the set time value T. Here, the time value T may be larger in accordance with the frequency of the track cross signal. Therefore, the adaptive noise remover 21 is capable of obtaining a track zero cross signal containing desired information while effectively removing noise from the track cross signal.

It is understood that the time value T may be variously expressed, such as a count value of a counter. For instance, assuming that a track cross frequency may be set in a high-speed section as indicated in the following Table 1, a time t1 required to move a pickup to a ½ track is in the range from t1_min=0.5 μsec to t1_max=0.05 msec. If a noise section t2 ranges from ¼ to 1/12 of the time t1, the range of the noise section t2 is from t2_min=t1_min/12=41.6 nsec to t2_max=t1_max/4=12.5 μsec. If a system clock of 90 MHz is used, a quarter of one period of the system clock becomes 44.29 nsec. Thus, it is possible to set a count value (time value T) so that the entire range of the noise section t2 can be easily counted by a 9-bit counter at an interval of 44.29 nsec with the noise section having a range from 0 to 22.6 μsec. The set count value is applied by the noise remover 21.

TABLE 1

| CD | 10 kHz (MIN)–504 kHz (MAX) |
|---|---|
| DVD-RAM | 20 kHz (MIN)–1 MHz (MAX) |

The noise remover 21 removes the glitch noise from the track zero cross signal according to the time value T provided by the noise removing width setter 22. The noise remover 21 may include, for example, a register (not shown) and a counter (not shown), and thus removes the glitch noise from the track zero cross signal based on the count value set as described above.

Meanwhile, the speed measuring unit 31 measures the speed V of an optical spot (pickup) based on the track zero cross signal output from the noise remover 21. Since a period of the track zero cross signal corresponds to a track, the speed V of the optical spot (pickup) can be measured from the track zero cross signal indicated on a time axis. The speed profile generator 32 generates a speed profile containing command speed Vref related to the position or distance that the optical spot (pickup) is to move. A difference Verr is calculated between the command speed Vref and the measured speed V (Vref−V). The difference Verr is transmitted to the speed compensator 33. The speed compensator 33 sends an offset obtained based on the difference Verr to the DA converter 41. The DA converter 41 converts the offset into a corresponding analog signal and transmits the analog signal to the power driver 42. The power driver 42 transmits power corresponding to the received analog signal to the tracking actuator 5, and operates the tracking actuator 5 so as to search for a desired track.

Figure 8A:
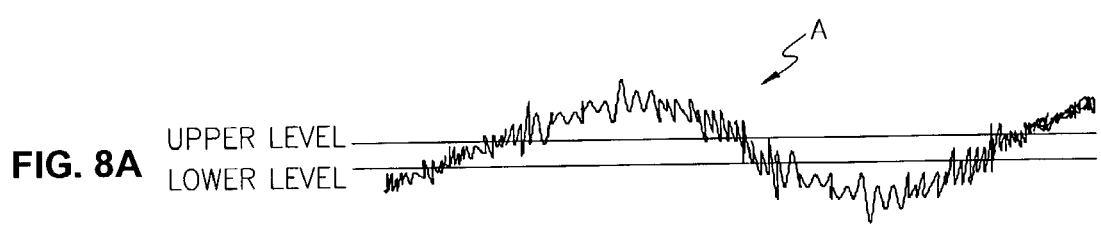
FIGS. 8A through 8D are timing diagrams explaining a method of canceling noise from a track cross signal using a noise removing apparatus according to an embodiment of the present invention.
Figure 8B:
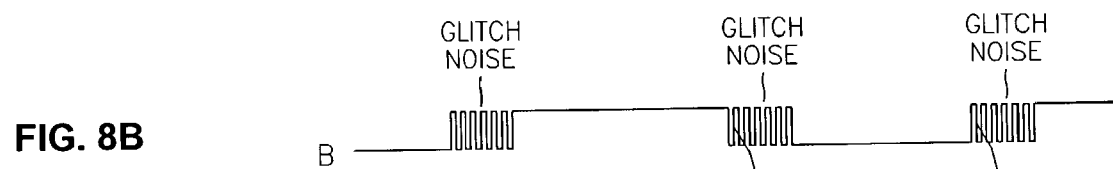
Figure 8C:
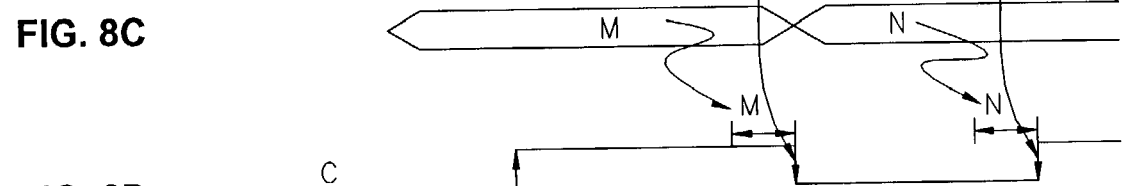
Figure 8D:

FIGS. 8A through 8D are timing diagrams explaining a method of removing noise from a track cross signal using a noise removing apparatus according to the present invention. Referring to FIGS. 8A and 8B, a track zero cross signal B is a track cross signal A binarized with regard to an upper level and a lower level. As shown in FIGS. 8C and 8D, signal C is the track zero cross signal B from which the noise removed is using time values M and N that are set using the present invention. When the level of the track zero cross signal B changes, counting begins as from a rising edge or falling edge of a system clock. The level of the signal C does not change in the event that the level of the track zero cross signal B changes again prior to the counting of predetermined counting values M and N. Signal C does change when the level of B does not change after the counting of the predetermined values M and N is completed.

Figure 9A:
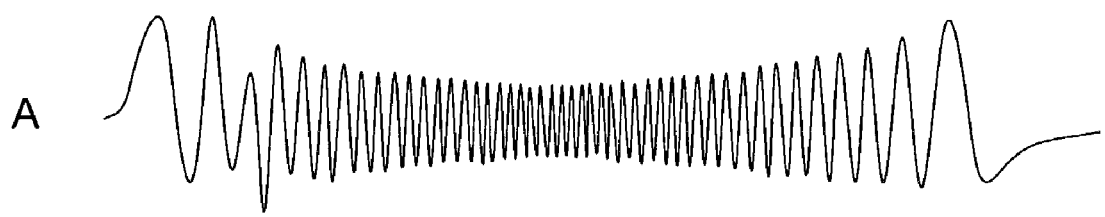
FIGS. 9A through 9C are waveform diagrams explaining the relationship between a noise removal width, a track cross signal, and command speed that is adaptively set, according to an embodiment of the present invention.
Figure 9B:
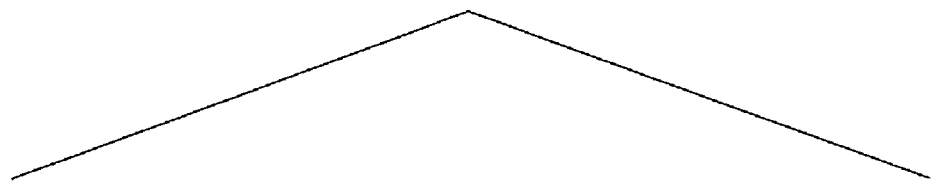
Figure 9C:

FIGS. 9A through 9C are waveform diagrams explaining the relationship between the noise removing width (time value T), a track cross signal A, and a command speed that are determined according to the present invention. FIG. 9A shows a track cross signal A detected from an optical disc. FIG. 9B shows a speed profile indicating the command speed. FIG. 9C shows a time value T (count value) of the track cross signal A illustrated in FIG. 9A, determined according to the speed profile illustrated in FIG. 9B. In general, the speed profile shown in FIG. 9B and the time value T shown in FIG. 9C are step-shaped when the amplitude of the track cross signal A is updated at a zero crossing point. However, the speed profile and time value T are illustrated as continuous signals for the sake of convenience.

Figure 10:
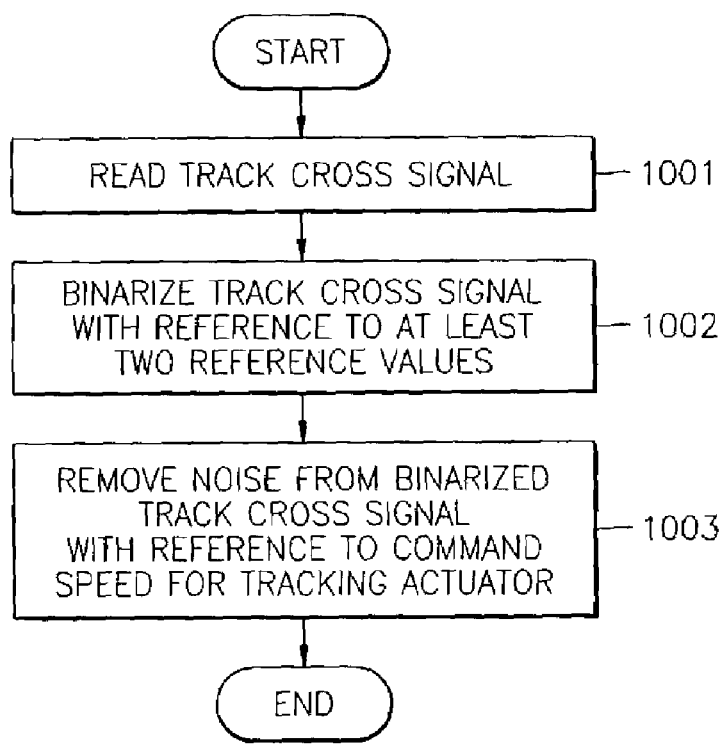
FIG. 10 is a flow chart explaining an embodiment of a method of canceling noise from a track cross signal.

Hereinafter, a method of removing noise from a track cross signal according to the present invention will be described. FIG. 10 is a flow chart explaining an embodiment of a method of removing noise from a track cross signal according to the present invention. Referring to FIGS. 5 through 7 and 10, a noise removing apparatus 6000, an optical disc driver 3000, or an optical disc reproducing apparatus 2000 as illustrated in FIG. 5 reads a track cross signal obtained when the optical spot of a pickup transverses tracks (operation 1001), and then binarizes the track cross signal referring to at least two reference values (operation 1002). Next, noise is removed from the binarized track cross signal according to a command speed Vref for a tracking actuator 5 (operation 1003).

Figure 11:
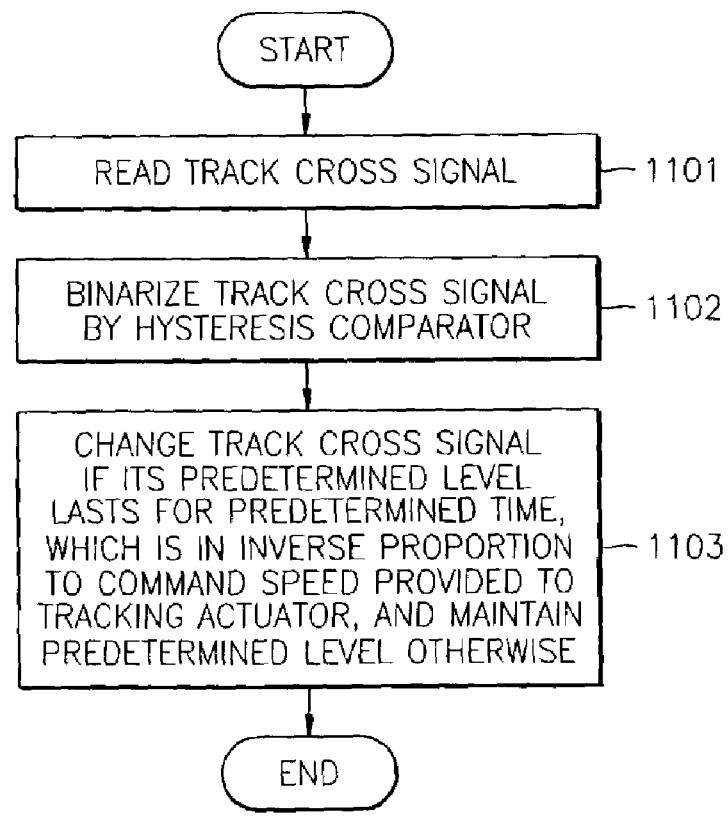
FIG. 11 is a flow chart explaining another embodiment of the method of FIG. 10.

FIG. 11 is a flow chart explaining another embodiment of the method of FIG. 10. Referring to FIGS. 5 through 7 and 11, a noise removing apparatus 6000, an optical disc drive 3000, or an optical disc reproducing apparatus 2000 reads a track cross signal obtained when the optical spot of a pickup transverses tracks (operation 1101). Next, a hysteresis comparator 1 of FIG. 7 binarizes the track cross signal by changing the level of the read track cross signal into a first level when the amplitude is larger than a first reference value, changing the level of the track cross signal into a second level when the amplitude is smaller than a second reference value, and by maintaining the level of the track cross signal when the amplitude is at or between the first and second reference values (operation 1102). Next, a track zero cross signal from which the glitch noise is removed is obtained by maintaining a predetermined level of the binarized track cross signal when the predetermined level is kept for at least a time value T, which is in inverse proportion to the command speed, and changing the predetermined level when the level is not maintained for the time value T (operation 1103).

Figure 12:
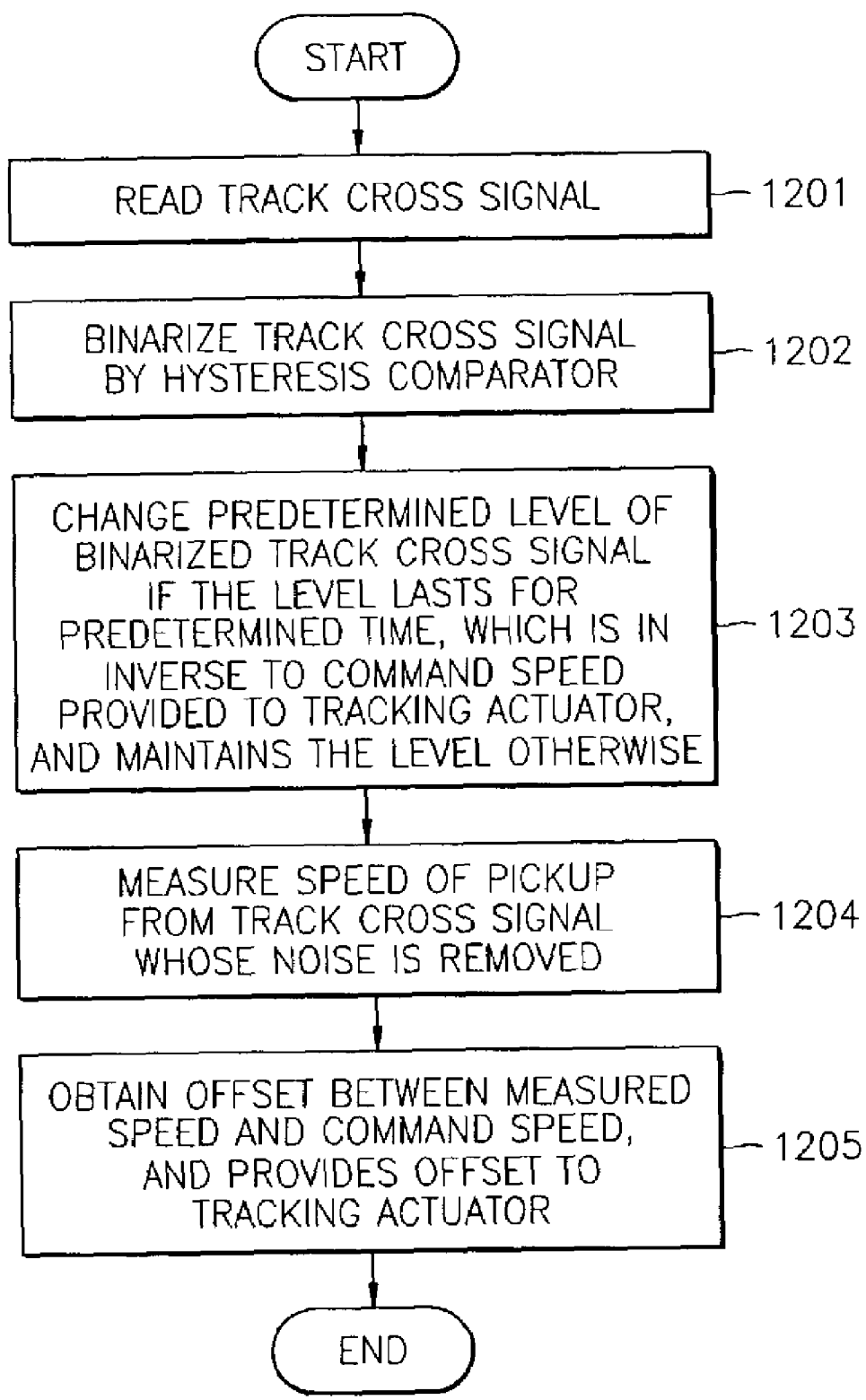
FIG. 12 is a flow chart explaining a method of controlling an optical disc drive (or an optical disc reproducing apparatus) according to an embodiment of the present invention.

FIG. 12 is a flow chart illustrating a method of controlling an optical disc driver 3000 (or a reproducing apparatus 2000) according to an embodiment of the present invention. Referring to FIG. 12, the optical disc driver 3000 reads a track cross signal generated when an optical spot transverses tracks of an optical disc in operation 1201. Next, the optical disc driver 3000 binarizes the read track cross signal with reference to at least two reference values in operation 1202, and removes noise from the track cross signal in consideration of a command speed Vref for a tracking actuator 5 in operation 1203. That is, a track zero cross signal whose noise is removed, is obtained by maintaining a predetermined level of the binarized track cross signal if the level is maintained for a time value T that is inversely proportional to the command speed Vref, and by changing the level if the level is not maintained for the time value T. Thereafter, the optical disc drive 3000 or the optical disc reproducing apparatus 2000 measures the speed of the optical spot of the pickup from the track cross signal whose noise is removed (operation 1204), compares the measured speed with the command speed Vref, and provides an offset, which is the comparison value obtained, to a tracking actuator 5 of FIG. 5 (operation 1205).

Recently, optical disc drives (ODD) have been developed to reduce a seek time of track searching of an optical disc so as to reduce the access time spent on recording/reproducing information on/from the optical disc. Therefore, a direct search control method, which requires no latency time for track pull-in, is applied to the long-distance track searching. In accordance with this trend, the present invention provides a method of effectively removing noise from a track cross signal so as to obtain information regarding precise track search speed or track position, irrespective of the searching speed. Further, a pickup of an optical disc drive can be controlled more effectively and precisely.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of removing noise from a track cross signal, the method comprising:
   binarizing the track cross signal;
   setting the binarized track cross signal at predetermined amplitudes based on whether a current amplitude of the track cross signal is larger or smaller than predetermined amplitudes, or maintaining the current amplitude if the current amplitude is at or between the predetermined amplitudes; and removing noise from the binarized track cross signal using a variable noise removing width determined in accordance with a detected command speed, the detected command speed being generated for a tracking actuator which moves a pickup according to a search distance, a search speed, and a position of a track to be searched for.

2. The method of claim 1, wherein the binarizing the track cross signal comprises:
changing a level of the binarized track cross signal to a first level when an amplitude of the track cross signal is larger than a first reference value,
changing the level of the binarized track cross signal to a second level when the amplitude of the track cross signal is smaller than a second reference value, and
maintaining the level of the binarized track cross signal when the amplitude of the track cross signal is at or between the first and second reference values.

3. A method of removing noise from a track cross signal, the method comprising:
binarizing the track cross signal with reference to reference values; and
removing noise from the binarized track cross signal in response to a detected command speed, the detected command speed being generated for a tracking actuator which moves a pickup according to the generated command signal, wherein:
the removing the noise comprises:
changing a predetermined level of a third signal if a level of the binarized track cross signal is maintained for a predetermined time value from an edge of the binarized track cross signal at which the level is first reached, and
maintaining the predetermined level of the third signal if the level of the binarized track cross signal is not maintained for the predetermined time value, and
the predetermined time value is inversely proportional to the command speed.

4. A method of controlling an optical disc drive, the method comprising:
reading a track cross signal from an optical disc, the read track cross signal including noise;
binarizing the read track cross signal with reference to reference values;
removing the noise from the binarized track cross signal based on a command speed for a tracking actuator used to move a pickup so as to produce a noiseless signal;
measuring a speed of the pickup from the noiseless signal;
obtaining an offset between the measured speed and the command speed; and
providing the offset to the tracking actuator.

5. The method of claim 4, wherein the binarizing the read track cross signal comprises:
changing a level of the binarized track cross signal into a first level when an amplitude of the read track cross signal is larger than a first reference value,
changing the level of the binarized track cross signal into a second level when the amplitude is smaller than a second reference value, and
maintaining the level of the binarized track cross signal when the amplitude is at or between the first and second reference values.

6. The method of claim 4, wherein:
the removing the noise comprises:
changing a predetermined level of the noiseless signal if a level of the binarized track cross signal is maintained for a predetermined time value from an edge of the binarized track cross signal at which the level is first reached, and
maintaining the predetermined level of the noiseless signal if the level of the binarized track cross signal is not maintained for the predetermined time value, and
the predetermined time value is inversely proportional to the command speed.

7. A noise removing apparatus comprising:
a comparator to binarize a track cross signal read from an optical disc and to set the binarized track cross signal at predetermined amplitudes based on whether a current amplitude of the track cross signal is larger or smaller than predetermined amplitudes, or to maintain the current amplitude if the current amplitude is at or between the predetermined amplitudes;
a controller to generate a command speed according to which a tracking actuator moves a pickup; and
a noise remover to detect the generated command speed generated by the controller, and to remove noise from the binarized track cross signal using a variable noise removing width determined in accordance with the command speed from the controller.

8. The noise removing apparatus of claim 7, wherein, in order to binarize the track cross signal, the comparator:
changes a level of the binarized track cross signal to a first level when an amplitude of the read track cross signal is larger than a first reference value,
changes the level of the binarized track cross signal to a second level when the amplitude of the read track cross signal is smaller than a second reference value, and
maintains the level of the binarized track cross signal when the amplitude of the read track cross signal is at or between the first and second reference values.

9. A noise removing apparatus comprising:
a comparator to binarize a track cross signal read from an optical disc with reference to reference values;
a controller to generate a command speed according to which a tracking actuator moves a pickup; and
a noise remover to detect the generated command speed generated by the controller, and to remove noise from the binarized track cross signal based on the command speed from the controller, wherein:
the noise remover:
changes a predetermined level of a third signal if a level of the binarized track cross signal is maintained for a predetermined time value from an edge of the binarized track cross signal at which the level is first reached, and
maintains the predetermined level if the level of the binarized track cross signal is not maintained for the predetermined time value, and
the predetermined time value is inversely proportional to the command speed.

10. An optical disc drive comprising:
a pickup that reads a track cross signal from the optical disc;
a comparator to binarize a track cross signal read from an optical disc and to set the binarized track cross signal at predetermined amplitudes based on a current amplitude of the track cross signal being larger or smaller than predetermined amplitudes, or to maintain the current amplitude if the current amplitude is at or between the predetermined amplitudes;
a controller to generate a command speed according to which a tracking actuator moves the pickup; and
a noise remover to detect the generated command speed generated by the controller, and to remove noise from the binarized track cross signal using a variable noise removing width determined in accordance with the command speed.

11. The optical disc drive of claim 10, wherein, in order to binarize the track cross signal, the comparator:
changes a level of the binarized track cross signal to a first level when an amplitude of the read track cross signal is larger than a first reference value,
changes the level of the binarized track cross signal to a second level when the amplitude of the read track cross signal is smaller than a second reference value, and
maintains the level of the binarized track cross signal when the amplitude of the read track cross signal is at or between the first and second reference values.

12. An optical disc drive comprising:
a pickup that reads a track cross signal from the optical disc;
a comparator to binarize the read track cross signal with reference to reference values;
a controller to generate a command speed according to which a tracking actuator moves the pickup; and
a noise remover to detect the generated command speed generated by the controller, and to remove noise from the binarized track cross signal based on the command speed, wherein:
the noise remover:
changes a predetermined level of a third signal if the level of the binarized track cross signal is maintained for a predetermined time value from an edge of the binarized track cross signal at which the level is first reached, and
maintains the predetermined level if the level is not maintained for the predetermined time value, and
the predetermined time value is inversely proportional to the command speed.

13. An optical disc drive comprising:
a pickup that irradiates light on an optical disc and reads a track cross signal;
a tracking actuator to move the pickup according to a command speed;
a comparator to binarize the read track cross signal with reference to reference values;
a noise remover to remove noise from the binarized track cross signal based on the command speed for the tracking actuator so as to provide a third signal; and
a controller to provide the command speed to the noise remover, to measure a speed of the pickup from the third signal, to obtain an offset between the measured speed and the command speed, and to provide the offset to the tracking actuator.

14. The optical disc drive of claim 13, wherein, in order to binarize the track cross signal, the comparator:
changes a level of the binarized track signal to a first level when an amplitude of the read track cross signal is larger than a first reference value,
changes the level of the binarized track signal to a second level when the amplitude is smaller than a second reference value, and
maintains the level of the binarized track signal when the amplitude is at or between the first and second reference values.

15. The optical disc drive of claim 13, wherein:
the comparator:
changes a predetermined level of the third signal if a level of the binarized track cross signal is maintained for a predetermined time value from an edge of the binarized track cross signal at which the level is first reached, and
maintains the predetermined level of the third signal if the level of the binarized track signal is not maintained for the predetermined time value, and
the predetermined time value is inversely proportional to the command speed.

16. An optical disc reproducing apparatus having an optical disc drive, comprising:
a pickup that irradiates light on an optical disc and reads a track cross signal from the optical disc;
a tracking actuator to move the pickup according to a command speed;
a comparator to binarize the read track cross signal with reference to reference values;
a noise remover to remove noise from the binarized track cross signal based on the command speed for the tracking actuator so as to produce a third signal; and
a controller to provide the command speed to the noise remover, to measure a speed of the pickup from the third signal to obtain an offset between the measured speed and the command speed, and to provide the offset to the tracking actuator.

17. The optical disc reproducing apparatus of claim 16, wherein, order to binarize the track cross signal, the comparator:
changes a level of the binarized track cross signal to a first level when an amplitude of the read track cross signal is larger than a first reference value,
changes the level of the binarized track cross signal to a second level when the amplitude is smaller than a second reference value, and
maintains the level of the binarized track cross signal when the amplitude is at or between the first and second reference values.

18. The optical disc reproducing apparatus of claim 17, wherein:
the noise remover:
changes a predetermined level of the third signal if a level of the binarized track cross signal is maintained for a predetermined time value from an edge of the binarized track cross signal at which the level is first reached, and
maintains the predetermined level if the level of the binarized track cross signal is not maintained for the predetermined time value, and
the predetermined time value is inversely proportional to the command speed.

19. An optical disc drive comprising:
a pickup that reads a track cross signal;
a tracking actuator to move the pickup according to a command speed;
a comparator to binarize the read track cross signal according to whether an amplitude of the read track cross signal is in a first set of values or is in a second set of values;
a noise remover to remove noise from the binarized track cross signal based on the command speed for the tracking actuator so as to provide a third signal; and
a controller to generate the command speed used by the noise remover for use in the tracking actuator, to compare the command speed with a speed of the pickup determined using the third signal to provide an offset, and to control the tracking actuator using the command speed and the offset.

20. The optical disc drive of claim 19, wherein the first set of values are amplitudes above and not below a first value and the second set of values are amplitudes below and not above a second value.

21. The optical disc drive of claim 19, wherein the comparator comprises a hysteresis comparator.

22. The optical disc drive of claim 19, wherein the noise remover comprises:
    a noise width setter which sets a reference time according to the command speed, and
    an adaptive noise remover which determines whether a level of the binarized track cross signal has been maintained for at least the reference time, and changes a level of the third signal unless the level of the binarized track cross signal has not been maintained for the reference time so as to remove the noise from the binarized track cross signal.

23. The optical disc drive of claim 22, wherein the noise width setter sets the reference time to be inversely proportional to the command speed.

24. The optical disc drive of claim 22, wherein the reference time comprises a counter value used by the adaptive noise remover to determine a duration of time the level of the binarized track cross signal has been maintained according to a system clock.

25. The optical disc drive of claim 24, wherein the adaptive noise remover further comprises a register and a counter which uses the counter value to determine the duration.

* * * * *